United States Patent Office 3,024,459
Patented Mar. 6, 1962

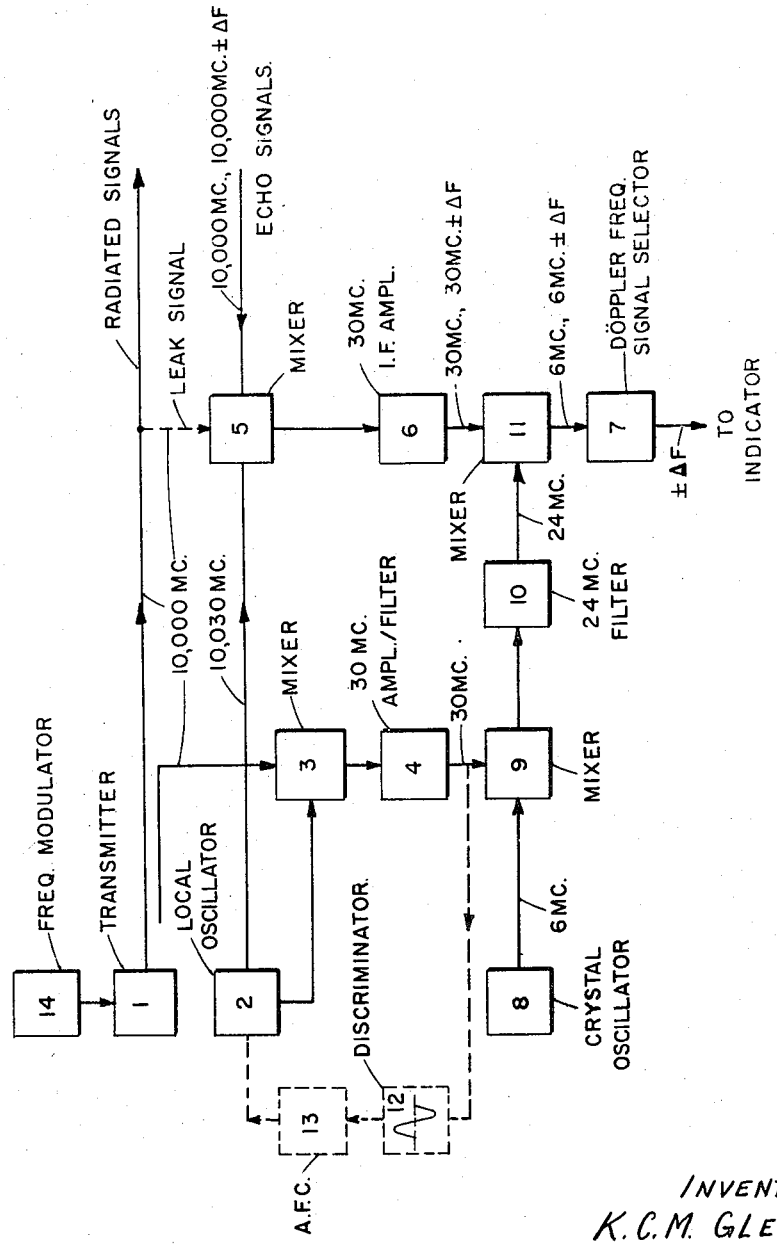

3,024,459
CONTROL OF MICROPHONIC EFFECTS IN CONTINUOUS WAVE RADAR SYSTEMS
Keith Cecil Malcolm Glegg, Pointe Claire, Quebec, Canada, assignor to Canadian Marconi Company, Montreal, Quebec, Canada
Filed June 4, 1956, Ser. No. 589,164
Claims priority, application Canada Sept. 17, 1955
2 Claims. (Cl. 343—17.5)

This invention is concerned with continuous wave radar systems, that is radar systems of the type wherein echo signals are received for examination simultaneously with the transmission of further signals for subsequent examination of their echoes, and is directed to the reduction of the effects of instabilities in the system such as those resulting from microphonics.

In continuous wave radar systems the problem exists of separating signals leaking from the transmitter directly to the receiver from the desired echo signals. It is seldom practicable to so design the antenna system and provide shileding that will reduce this leak signal to a value which is not more than 60 decibels greater in amplitude than that of the weakest echo signals that must be received. In many systems, and particularly in simple Doppler systems, the frequency difference between the leak signal components and the received echo signals may be within the audio spectrum, and this necessitates that very high orders of frequency stability be maintained in order that the leak signals do not mingle with the echo signals and thus obscure them.

In a simple Doppler radar it would appear at first glance that, to select the echoes received from a moving target, all that would be necessary would be to beat a sample of the transmitted signals against the leak and echo signals, and by heterodyne action obtain a direct current component plus a component having the frequency of the Doppler shifted echo signals. However, crystal detectors suitable for use at the microwave frequencies involved in radar systems generate an excessive amount of low frequency noise when passing current, this noise varying inversely with frequency. In consequence, then, a superheterodyne receiver system is employed, the first detector producing its output at an intermediate frequency whereat the crystal noise is insignificant. This, however, brings up the problem of maintaining a constant frequency difference between the transmitter and the local heterodyne oscillator.

One solution to this problem is that set forth in my co-pending United States patent application Serial No. 589,166, now abandoned, entitled Frequency Stabilization of Continuous Wave Radar Systems and filed simultaneously with the instant application. It has been found, however, that in certain radar systems such as aircraft Doppler radar groundspeed indicators, further very serious problems may remain even after an intermediate frequency signal free from extraneous frequency modulation has been obtained. Vibration of the radar will result also in amplitude modulation with the result that the leak signal component from the intermediate frequency amplifier will be the equivalent of a carrier wave with pairs of sidebands spaced therefrom by the frequencies of the various vibration components.

Thus the leak signal at the output of the intermediate frequency amplifier will be effectively spread out over a band of frequencies clustered about the nominal intermediate frequency. If these frequencies overlap the frequency of the Doppler shifted echoes there is no possibility of separation by the use of frequency selective filters.

An aim of the invention, therefore, is to provide means whereby the amplitude modulation components of the leak signal in a continuous wave radar resulting from system instabilities may be separated from the modulation components of the returned echo signals.

According to the invention, in a continuous wave radar subject to extraneous modulation and having a superheterodyne receiver of the type wherein the transmitter leak signal components at the output of the intermediate frequency amplifier have been stabilized to prevent frequency modulation thereof, there is provided means to frequency modulate the transmitter at a given rate, and means to select from the output of the intermediate frequency amplifier for examination signals in a frequency modulation sideband remote from any amplitude modulation sidebands resulting from said extraneous modulation present in said output.

The invention will be further described with reference to the accompanying drawing which shows in block diagram schematic form a preferred embodiment of the invention.

In the drawing the transmitter, 1, radiates signals, shown here as of 10,000 megacycles, which are returned as echoes of 10,000 megacycles from fixed targets and 10,000 megacycles $\pm \Delta f$ from a moving target to the receiver heterodyne mixer, 5, which also picks up leakage signals from the transmitter. A local oscillator, 2, which is tuned to 10,030 megacycles feeds signals to mixer 5. This local oscillator may be or any appropriate type such as a Klystron. From mixer 5 the 30 megacycle heterodyne signal is fed through the intermediate frequency amplifier 6 to a mixer 11.

Local oscillator 2 also feeds signals to a mixer 3, to which is applied a sample of the transmitter signal. The 30 megacycle component of the mixer 3 output is selected by an amplifier or filter and applied to a mixer 9. An automatic frequency control loop represented by a discriminator 12, and an automatic frequency control unit 13 are indicated by dashed lines. While not inherently a part of the present invention it is desirable in practice to provide at least a coarse control of the local oscillator frequency. Known systems of automatic frequency control have been found incapable of eliminating frequency variations caused by vibration microphonics, but they will keep the average local oscillator tuning on nominal frequency.

To the mixer 9 is fed also a signal from a stable oscillator, 8, preferably crystal controlled and operating at a frequency of 6 megacycles in this example. The 24 megacycle heterodyne component produced by mixer 9 is selected by filter 10 and applied to mixer 11 to beat with the 30 megacycle intermediate frequency signal derived from the received and leak signals. The output from mixer 11, fed to a channel responsive to 6 megacycles, contains difference frequency components of 6 megacycles, representing the leak and fixed target signals, and 6 megacycles $\pm \Delta F$, representing the Doppler shifted echo signals. These signals will have the frequency stability of the crystal oscillator 8, since frequency variations of both the transmitter 1 and local oscillator 2 will have been cancelled, at least in respect to first order effects, by beating each against itself in mixer 11.

We therefore have at the output of mixer 11 a signal representative of the leak signals which has been freed from frequency variations due to microphony of either transmitter or local first heterodyne oscillator.

The system as so far described is that set forth in applicant's co-pending United States patent application entitled Frequency Stabilization of Continuous Wave Radar Systems and filed simultaneously with the instant application. If such a radar system is vibrated, both frequency and amplitude modulation will result. It will be apparent that by use of such a system the effects of frequency modulation upon the leak signal will be removed. However, sidebands representative of the amplitude modulation will still be present at the output of the mixer 11, and in certain applications as previously noted such sideband components may overlap in frequency the desired echo signals and hence obscure them.

Let us now apply frequency modulation by means of a modulator 14 to the transmitter. The output from the transmitter, as is well known in the art, will then consist of a number of sidebands, dependent upon the modulation index chosen, each separated by the frequency of the modulation, together with a carrier frequency of amplitude also dependent upon the modulation index. It is to be understood that in the diagram the frequency labelled signal channels carry frequency modulated waves with their attendant sidebands but that for purposes of clarity the nominal frequencies only are shown.

It will be evident from the foregoing description of the operation of the system that the frequencies of these several sideband products at the output of mixer 11 will be stable, and hence capable of selection by filters. What is of fundamental importance in the present instance, however, is the fact, demonstrable by rather laborious mathematics and proved in actual practice, that the amplitude modulation sideband products remain clustered about the frequency representative of the carrier. Therefore, the spectrum about the frequency modulation sidebands will contain only Doppler shifted echo signals free from amplitude modulated leak signals. It will be evident to those skilled in the art that the choice of the particular sideband spectrum distribution to be used will depend upon general overall radar design considerations. For instance, the modulation frequency may be chosen to be in the order of twice the highest extraneous modulation frequency component, the modulation index kept low, in the order of 1 to 2, and the spectrum centered around the first sideband examined. Obviously, however, the principles of the invention would apply equally to a system using different modulation frequencies and indices, and where a different sideband is selected for examination. For instance, the modulation frequency could be less than the highest noise frequency, the modulation index being made relatively large, and a high order sideband examined.

Techniques are well known in the art for selecting the desired frequency sideband spectrum for examination, and it is not considered either necessary or desirable to set forth a system which, while it might be preferred for the illustrated radar system, would not necessarily be appropriate to another system which also utilizes the principle of the invention. As pointed out in applicant's abovementioned copending United States patent application entitled Frequency Stabilization of Continuous Wave Radar Systems and filed simultaneously with the instant application, the frequency of the stabilized intermediate frequency signals may be further reduced by a further superheterodyne process to enable the use of filter networks at lower frequencies whereat the fractional spectrum frequency separation of the various sidebands is greater. In view of the above, the drawing simply indicates the required circuitry as block 7, the Doppler frequency signal selector.

Now, in a system employing the invention the radiated and received energy is divided between the plurality of frequency modulation sidebands. In its simplest form a single sideband is selected for examination and hence a proportion of the total power is not used, although it is obvious that more than one sideband could be simultaneously examined if the added complexity were deemed justified. However, in one radar system for use in an aircraft, and employing quite elaborate previously known means to prevent the effects of vibration, the application of the present invention in that form wherein a single frequency modulation sideband only was used effected an improvement in overall performance in the order of 30 to 40 decibels, and this despite the fact that at least 8 decibels of power was not available due to its distribution amongst the various sidebands. It is therefore evident that the said distribution of power amongst the sidebands is greatly outweighed by the other advantages resulting from the use of the invention.

For the purposes of clarity in presenting the principles of the invention it has been described with reference to a simple Doppler radar system. It will, however, be realized that the invention may equally well be applied to other continuous wave radar systems wherein instabilities of the transmitter leakage signal are troublesome.

The embodiments of the invention in which an exclusive property or privilege is claimed are defined as follows:

1. A continuous wave Doppler radar system comprising, a receiver of the superheterodyne type and comprising a fixed frequency local oscillator a first mixer and a bandpass I.F. amplifier said I.F. amplifier having a bandwidth sufficient to pass at least one pair of the heterodyned frequency modulation sidebands hereinafter defined, means to feed target echo signals and signals from said local oscillator to said first mixer, a frequency modulated transmitter operating at a given carrier frequency and producing signals bearing microphonic noise amplitude modulations of given maximum frequency which leak into said receiver, means to frequency modulate said transmitter at a frequency of modulation exceeding said given maximum frequency of noise amplitude modulations and with a low modulation index of value such as to produce a low plurality of frequency modulation sidebands, and filter means fed with signals from said I.F. amplifier adapted to select the heterodyned product of target echo signals borne by at least one of said frequency modulation sidebands translated by said I.F. amplifier to the exclusion of the heterodyned noise modulated carrier signal.

2. A continuous wave Doppler radar system as claimed in claim 1 and further comprising in combination therewith a second mixer, means to apply to said second mixer signals from said transmitter and signals from said local oscillator, a second I.F. amplifier of like characteristics to the firstmentioned I.F. amplifier fed from said second mixer, a highly stable oscillator operating at a frequency which is low in comparison with the frequency of operation of said I.F. amplifiers, a third mixer fed with signals from said highly stable oscillator and from said second I.F. amplifier, a second filter fed from said third mixer and adapted to select one heretodyne sideband product of said third mixer, a fourth mixer fed from said second filter and from said first I.F. amplifier, and wherein the firstmentioned filter means adapted to select target echo signals is fed from said fourth mixer and operates in the frequency spectrum at the frequency of said highly stable oscillator.

References Cited in the file of this patent

UNITED STATES PATENTS 2,518,864     Carlson _____ Aug. 15, 1950